United States Patent Office 3,534,214
Patented Oct. 13, 1970

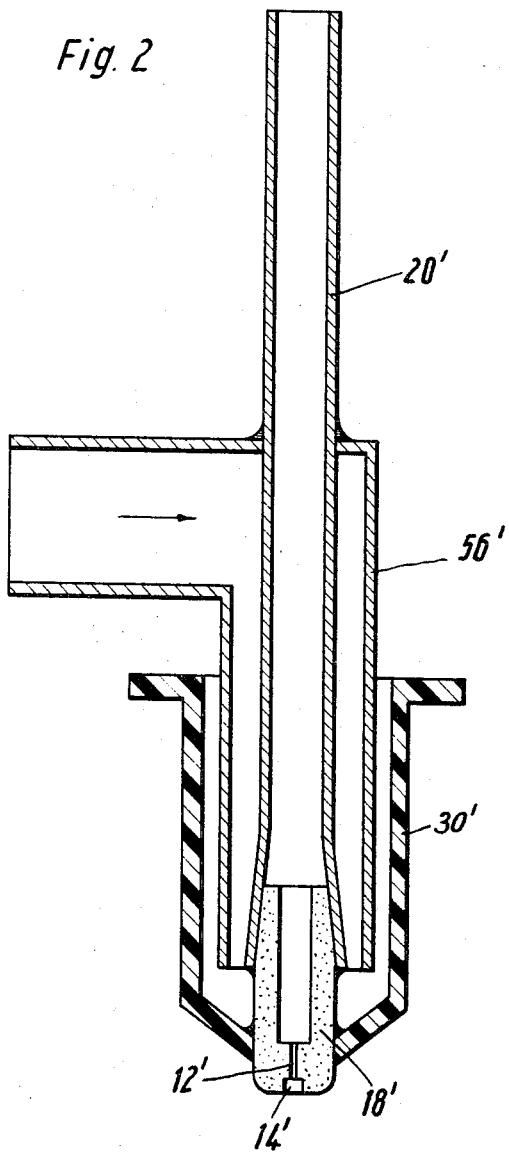
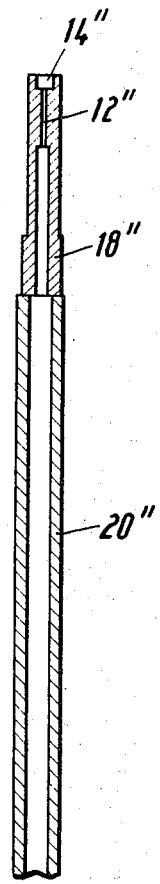

3,534,214
ARC DISCHARGE PLASMA BURNER APPARATUS
Winfried Völker, Frankfurt am Main, Germany, assignor to Original Hanau Quarzlampen G.m.b.H., Hanau, Germany, a limited liability company of Germany
Filed Apr. 10, 1968, Ser. No. 720,294
Claims priority, application Germany, Apr. 12, 1967, Q 938
Int. Cl. H01j 17/26
U.S. Cl. 313—231
14 Claims

ABSTRACT OF THE DISCLOSURE

To increase ultra violet radiation from a plasma burner, liquid mercury is injected from a hollow electrode into a plasma arc through a capillary bore; both the housing surrounding the electrodes, as well as the injection electrode itself are cooled separately from the outside by a cooling jacket surrounding the housing retaining the plasma as well as the electrodes; narrow slots, in the order of 0.1 millimeter width, interconnect the inside of the housing to the outer cooling jacket to permit condensed mercury to be removed, for re-cycling to the arc.

---

The present invention relates to plasma apparatus, and more particularly to the burner assembly for a plasma generator to generate an arc rich in ultra violet radiation.

Simulation of extra terrestrial radiation, such as radiation from the sun, is a problem which arises in various fields, for example photo synthesis, photo analysis, and extra terrestrial research in general. Simulation of solar radiation is particularly important in the study of biochemical processes, since sunlight contributes greatly to the reaction mechanisms of various biological functions. Additionally, planning and preparation of space exploration often necessitates tests of components under simulated extra terrestrial conditions in a laboratory.

Simulation of solar spectra in the ultra violet region is much more difficult than within the visible portion of the spectrum. It has been proposed to utilize xenon discharge tubes to simulate extra terrestrial solar emission. The spectra of such xenon discharge tubes are very close to the spectra of solar radiation, except for the emission band about $8 \times 10^{-4}$ mm. Emission bands of about 0.8 $\mu$ ($8 \times 10^{-4}$ mm.) from the xenon spectrum are largely suppressed by filters, mirrors, and other optical devices. In order to obtain high intensity of radiation, it is thus necessary to provide arc lamps and light sources having a high light flux and high density within the arc plasma. Electrical input of 7.5 kw., however, results in output of only 1.275 kw. radiated power within the region to be irradiated. The remaining energy must be removed in the form of heat, by cooling mirrors and other optical devices—which is both inefficient and difficult to achieve.

It has further been proposed to utilize hydrogen, or mercury arc discharges in high power discharge lamps in order to obtain a spectral distribution in the ultra violet region similar to solar emission.

Plasma burners utilizing nitrogen, or argon, in order to achieve radiation similar to that of solar radiation are, like the xenon discharge, generally rather weak in the intensity yield. Energy losses in closed arc lamps are substantial, since the largest part of the electrical input power must be removed in the form of heat, and is not available to supply output radiation. Plasma burners, operating with argon or nitrogen provide radiation in the longer wave length regions of the spectrum.

Increasing the electrical input results in an increased radiation output, since the radiation flux, and the density of radiation from the region between the electrodes is increased. The higher input power requires, however, elaborate cooling of the electrodes in order to prevent their destruction.

It is an object of the present invention to provide a source of radiation, simulating solar radiation, which is efficient in operation and has high yield.

SUBJECT MATTER OF THE PRESENT INVENTION

Briefly, in accordance with the present invention, a housing which is internally highly polished and reflective, and formed with a window (for example of quatrz) has a pair of electrodes inserted therein; one of the electrodes is hollow. The entire housing is surrounded by a water jacket, with one or more narrow openings, for example of a width of 0.1 mm. interconnecting the inside of the housing with the jacket. A liquid metal, preferably mercury, is introduced through the hollow electrode to be injected into the arc formed between the electrodes. Liquid mercury which, after vaporization, again condenses on the cooled window and walls of the housing can drip back into the cooling region through the narrow slots, cooling water being excluded from the space within the housing by internal pressure within the housing arising in operation.

Preferably, the electrode is formed with a tip of refractory material, such as tungsten, and is recessed in the region of the end of the opening of the central bore, which may be a capillary opening, to protect the injection opening for the liquid mercury.

A separate cooling mantle or shroud preferably surrounds the electrode. This arrangement provides for constant temperature operation of the electrode. The mercury, being injected through the capillary opening under pressure, may reach the boiling point. If the injection electrode is located at the bottom of the housing, so that the mercury is forced, by pressure, upwardly, increase of pressure within the capillary bore beyond the boiling point of the mercury causes a drop in the level of the liquid mercury, so that less mercury will evaporate in the electrode tip, and any excessive pressure rise is counteracted. Conversely, if the injection electrode is located above the housing, so that mercury is injected while dropping under gravity, the temperature of the electrode will again remain constant since at the point at which the capillary bore joins the enlarged protective recess, a junction surface between liquid and gaseous aggregate of mercury will result. Increasing the pressure in this region causes increase in the formation of bubbles of mercury vapor within the recess of the injection electrode, which bubbles will rise surrounding the electrode along the housing, and condense as they leave the actual injection point; the heat of condensation quickly cools the electrode tip, and further can be carried off by water cooling of the injection tip, so that the wall temperature of the injection electrode is again brought back to a stable, equilibrium value.

The light source of the present invention can be made small, provide for substantial input and has a high output light flux with high radiation density within the plasma, thus providing high intensity ultraviolet radiation of the output.

The capillary bore within the tungsten tip of the electrode is preferably as long as possible, and as small as possible consonant with manufacturing processes. The temperature of the mercury, upon injection into the discharge region, can be increased, and the injected stream of mercury can be held more stable, with increase in the length of the capillary bore. Further, as the cross-sectional area of the capillary bore is decreased, the injection speed of the mercury will increase, and less mercury will flow before the arc is started, or if the arc should fail or be turned off. The recess terminal end of the capillary bore at the tip of the injection electrode prevents melting and closing of the capillary bore and increases the number of the electrons emitted from the heated electrode surface, due to the increase in surface immediately surrounding the injection opening.

The lamp housing, containing the electrodes, is preferably enclosed entirely, together with the electrodes, from the outside by a jacket filled with a cooling fluid, such as water, oil, or organic liquids. These cooling fluids are so chosen that the removal of heat from the lamp housing ensures sufficient cooling of the interior surface of the lamp housing and thus enables condensation of metal vapors along their surfaces in order to relieve internal pressures on the lamp housing. Applying cooling water (or other cooling liquids) to the mantle surrounding the electrode, cools the electrode lead and tip. Preferably, the mantle surrounds the fitting between the injection electrode and the attachment leads thereto. By thermal convection, the cooling liquid will rise along the electrode, thus cooling both the refractory metal (for example tungsten) electron tip as well as the junction of the electrode tip and the remainder of the electrode.

The other electrode, that is the one through which no metal is injected, is also preferably cooled both from the outside as well as from the inside. Preferably, the electrode is formed hollow and has, in accordance with a feature of the present invention, a tube inserted therein to conduct cooling liquid, which tube is formed at the outside with projections or the like in order to increase turbulence of the cooling liquid supplied to the interior of the electrode.

The lamp housing is preferably generally of circular shape, highly polished in the inside in order to increase light reflection and re-introduction of energy to the plasma, and further covered at its interior with a layer of a material forming an amalgam in order to prevent coating of the highly polished interior surface by evaporated metal, and decrease of the reflectivity of the surface. Formation of the amalgam with the interior surface of the lamp housing will provide an even, uniform cover which, by surface tension, forms a smooth and highly reflected surface, increasing the reflection into the center of the plasma and having high surface tension so that tungsten which might evaporate and condense will merely slide off and not interfere with the reflectivity of the surface.

The cooling capacity, as well as the shapes of the electrodes are, in accordance with the present invention, formed in such a manner that the injected, liquid mercury is additionally cooled by heat removal required by the energy of evaporation.

The structure of the plasma generator in accordance with the present invention can be readily manufactured; preferably, the burner assembly is located on an insulating plate, removably secured by a ring within the cooling liquid jacket. Plastic parts are particularly suitable therefor.

A window projection can be secured to an opening within the lamp housing which can be carried outwardly of the cooling liquid jacket, electrically insulated therefrom, and closed off by a window of quartz. Channels are formed, adjacent the window, in the extension in order to carry off liquid mecury condensing on the quartz window to prevent contamination of the transmissivity of the quartz window itself. Upon starting operation of the arc lamp, a circulating pump injects mercury, under pressure, into the arc region. Before the arc itself forms, the possibility arises that mercury will splash against the quartz window and, after dripping off, leave tiny droplets at the window surface which, upon evaporation after starting of the arc, form a contaminating layer. The channels, preferably arranged at opposite sides of the window, can be connected to a closed cooling circuit, thus providing for cooling as well as flushing and clearing of the quartz window.

The structure, organization, and operation of the invention will now be described more specifically with reference to the accompanying drawings, wherein:

FIG. 2 is a vertical cross-sectional view of a modified form of an injection electrode;

FIG. 3 is a vertical cross-sectional view of another modification of an injection electrode.

Figure 1:
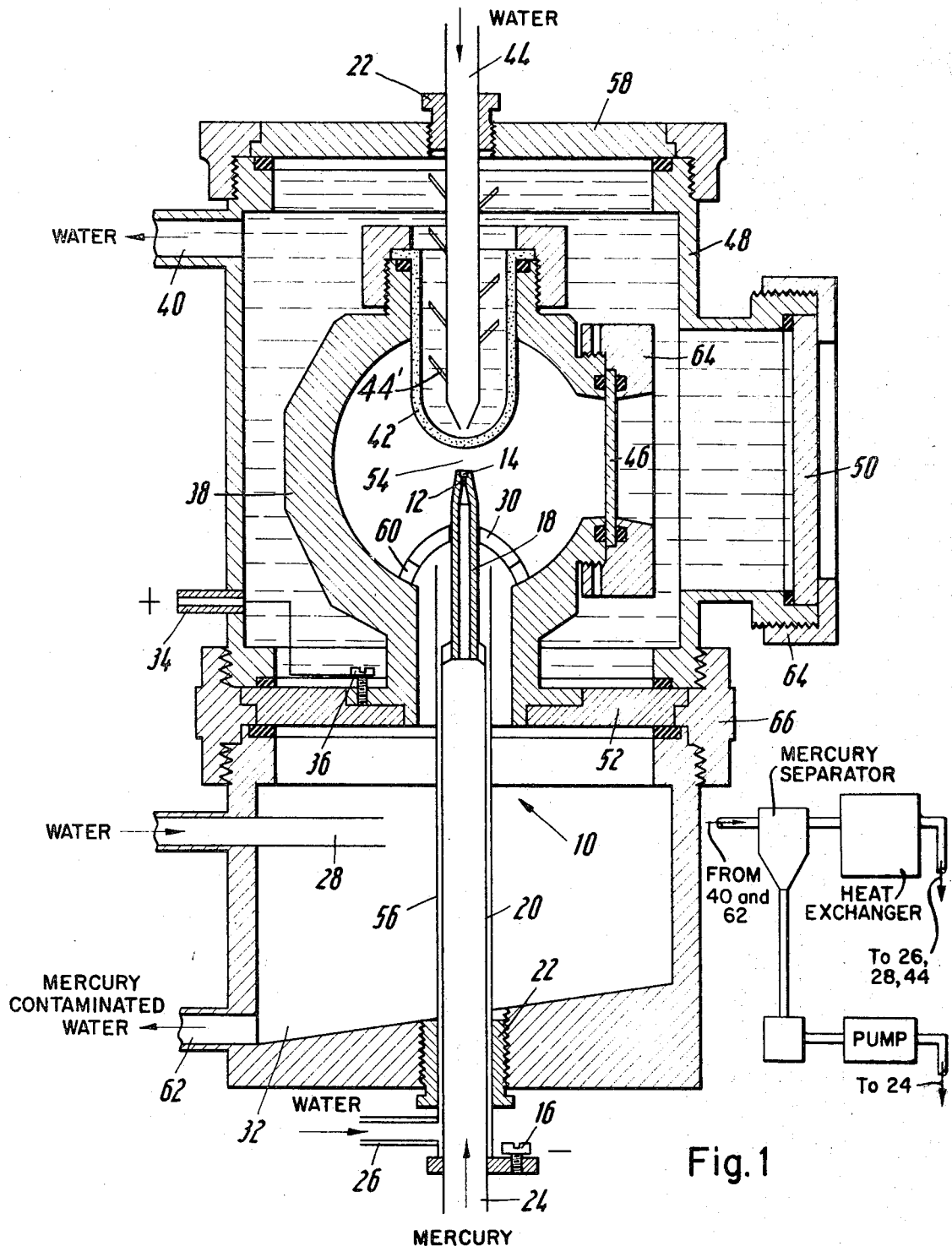
FIG. 1 illustrates a vertical cross-sectional view, in somewhat schematic form, of the plasma injection apparatus of the present invention.

An injection electrode system 10 has an electrode connection 20, which is hollow, and an electrode tip 18 formed of tungsten. An outer mantle 56 is connected to a water inlet stub 26, in order to cool the electrode 20, as well as the tip portion 18. Liquid metal, such as mercury, is introduced at 24 into the interior of electrode 20, and then enters capillary bore 12 within tungsten tip 18. The mercury is accelerated in capillary bore 12 and injected into the discharge space 54 of the plasma burner. The end of capillary bore 12 is recessed, as seen at 14, within the tip of injection tip 18. The injected, liquid metal increases the density of an arc plasma formed between electrode 10, and an opposed, hollow electrode 42.

An insulating seal 22 seals off electrode assembly 10 and mantle 56 from an outer surrounding jacket, forming a chamber 32. Cooling liquid, such as water, supplied through stub 26 and passing in the space between mantle 56 and electrode 20, and tip 18 flows along the electrode and the tip, cooling the junction between the fitting, or electrode lead 20 and the tip 18, and a portion of the tungsten tip 18 as well. The stream of water leaving the mantle 56 is deflected by a bowed deflector element 30, formed of insulating material, to fall down and be deflected back into chamber 32. The bowed insulator 30 prevents introduction of cooling liquid into the discharge room 54, and chemical reaction of the cooling liquid with the hot material of the electrodes, and thus its possible detruction. The insulator 30 is, however, formed with a narrow slit 60 to provide for communication between the interior of a lamp housing 38, so that condensed metal and metal vapors arising within discharge space 54 may also return into chamber 32. Chamber 32 has, independently cooling liquid (water) introduced thereto through an inlet 28; cooling liquid is removed from an outlet 62 connected to a closed cooling system. Condensed metal will form in small droplets of from 1–2 mm. diameter from the discharge space 54, and will be introduced into the cooling water through slots 60 of about 0.1 mm. width, to be removed from space 32 together with any condensed metal vapors by the cooling system. The cooling system is arranged to have a trap for heavy metal particles, for separation of such particles from the cooling liquid, for re-introduction to a pump for injection through the injection electrode assembly 10. The closed cooling loop, as well as the removal apparatus for metal, and the injection pump are not shown in detail in FIG. 1, for purposes of clarity, and since all elements are well known and standard components commercially available.

Electric current is applied to the electrode assembly 10, forming the cathode, by means of a collar and connection 16. The positive pole of the current supply is connected at an insulator 34.

Chamber 32 is separated from the remainder of the jacket, as well as from the plasma assembly itself by means of an insulating plate 52, against which the upper part of the jacket, 48, is also located. Insulator plate 52 is formed with a central opening; injection electrode 10 extends through the central opening into the interior of the lamp housing 38. The lamp housing 38 itself is connected on the insulator plate 52 by means of a hollow socket-like extension. The interior of lamp housing 38 is spherical, and reflects radiation between the two electrodes back into the plasma.

A cylindrical, hollow electrode, closed off by a rounded cap, is inserted into lamp housing 38 from above. Hollow electrode 42 is supplied with a cooling fluid through a central tube 44, housing a conical end piece or nozzle therein. Interior cooling of electrode 42 prevents destruction of the hollow electrode, and excessive use of its material. The tube 44 is preferably provided with external projections 44' which increase the turbulence of the electrode cooling fluid and thus the heat exchange of the cooling fluid with the hollow electrode 42.

Lamp housing 38 is formed on one side with a window socket, into which a window consisting of a quartz disc 46 is inserted. Quartz window 46 is secured to the housing by means of a cover 64, threaded on lamp housing 38. The quartz window 46 is intensely irradiated on the side facing the arc and becomes hot. Condensation of metallic vapors along the window is thus essentially avoided.

The top part of the lamp assembly is cooled by cooling fluid, such as water, introduced through tube 44, as schematically indicated by the arrow, which cooling fluid then will surround the housing, to be removed from an outlet 40. The outer face of quartz window 46 is thus constantly in contact with cooling liquid.

Lamp housing 38 has an electrical connection 36, connected to positive terminal 34, for connection to a source of direct current potential (the other pole being connected to terminal 16). The outer mantle 48 is preferably of stainless steel, and likewise seats against insulating plate 52. A ring 66, having a pair of threads thereon, forms a removable attachment both for the jacket portion 48, as well as for the jacket portion forming chamber 32.

A quartz window 50 is located inside of jacket 48, exposed to the radiation from window 46. The distance between windows 46 and 50 can be suitably chosen so that the cooling fluid within jacket 48 absorbs radiation in a wave length which is not desired to be transmitted. A flanged threaded ring 64 secures window 50 in position.

The diameter of the opening in the top wall, 58, of jacket 48, through which tube 44 passes, is preferably chosen to be identical to that of the lower jacket portion forming chamber 32, so that the seals 22, both at the bottom and at the top of the jacket may be identical. By providing an insulated contact for the positive potential 34, and an insulated internal connection to terminal 36, the entire outer jacket can be grounded.

FIG. 2 illustrates a different embodiment of injection electrode, which is particularly suitable for inversion of the relative position of the electrodes, that is for placing the anode 42 at the bottom, and the cathode at the top. The electrode illustrated in FIG. 2 can be substantially heated. Tube 56' extends until just about the end of the tungsten tip, which is seated in insulator 30'. The end portion 18' has only a short capillary bore 12', again recessed at 14'. The entire construction permits application of cooling liquid almost to the tip of the electrode.

FIG. 3 illustrates another embodiment of the injection electrode 20" which is hollow and formed with a central passage. A recess 14" is formed at the end of capillary bore 12" of the refractory metal electrode tip 18". The material chosen for the electrode tip 18" of FIG. 3 is a thermally resistant alloy non-reactive with mercury so that no amalgam will be formed.

Figure 4:
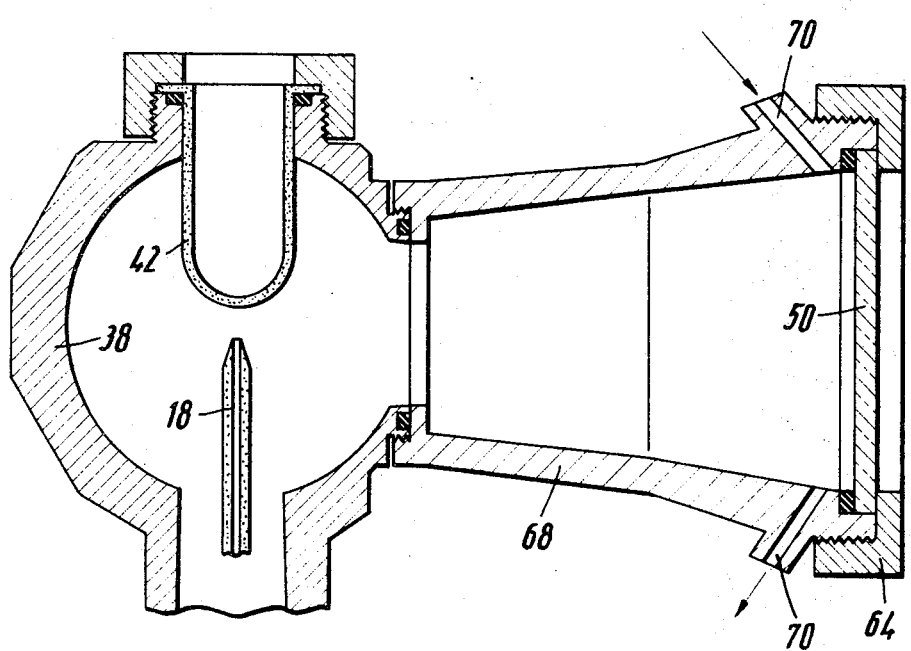
FIG. 4 illustrates connection of a window extension.

Lamp housing 38 may have an extension for a window attached thereto; FIG. 4 illustrates such an arrangement, the other necessary parts of the entire apparatus being shown only schematically and the same reference numerals being used as in FIG. 1 for similar parts. A window extension 68 is sealed to an opening of the lamp housing 38, having a single quartz window 50' at its remote end, secured to the extension 68 by means of flanged collar 64. Quartz window 50' is thus located remote from the area of the arc itself, arising between injection electrode 18 and hollow electrode 42.

Upon starting the source of FIG. 4, it is possible that liquid metal will splash against the quartz window 50' which, after impinging on the quartz window, will leave small droplets thereon which, after vaporizing subsequent to ignition, will contaminate the window surface and give it a dirty appearance. By utilizing the extension of 68, such splashing of un-vaporized condensed metal is largely avoided. A pair of oppositely located channels 70, connected to a closed cooling loop, may be used to cool the interior of quartz window 50', as well as flushing any covering from window 50'. The channels 70 may be formed in such a way as to provide a jet of cooling fluid, gaseous or liquid, directed against window 50' and removing cooling fluid from the lowest portion.

The present invention has been illustrated and described with an arc lamp particularly suitable for use with mercury. Various structural changes and modifications, as determined by the requirement of particular applications or uses may be made without departing from the inventive concept.

What is claimed is:

1. Arc discharge apparatus to provide an arc having intense ultraviolet radiation comprising
   a housing (38) having a transparent wall section (46, 50');
   a pair of elongated electrodes (12, 42) forming an anode (42) and a cathode (12) respectively, located in the housing and providing a short arc discharge region (54) therebetween substantially centrally of the housing; at least one of said electrodes being hollow, and having a tip portion (18) of refractory metal whereby said one electrode will function as an injection electrode;
   and means (10, 18) injecting a liquid metal under pressure into said discharge region (54) oriented to increase the density of the arc plasma between said electrodes with respect to the remainder of the space in the housing, said means comprising a capillary bore formed within said tip portion and having said liquid metal supplied thereto under pressure.

2. Apparatus according to claim 1, wherein said liquid metal is mercury and said housing has an internal shape which is spherical and is highly polished.

3. Apparatus according to claim 1, wherein the terminal end of the tip portion (18) in the region of termination of the capillary bore is formed with a recess (14) to protect the injection point of the liquid metal from the arc plasma at the tip portion of the electrode.

4. Apparatus according to claim 1, wherein the refractory metal of the tip portion of the electrode is tungsten.

5. Apparatus according to claim 1, including a cooling jacket surrounding the housing to retain cooling fluid surrounding the housing and the electrodes, said injection electrode being additionally cooled by evaporation of the liquid metal at the tip portion of the electrode.

6. Apparatus according to claim 2, the interior of the housing being covered with a layer of a substance forming an amalgam.

7. Apparatus according to claim 5, wherein said cooling jacket is formed with a pair of openings of similar size and geometric configuration, the electrodes extending through said openings;
   whereby either anode or cathode electrode may be inserted in either opening and the relative position of the electrodes reversed.

8. Apparatus according to claim 2, wherein said housing (38) is of conductive material, electrically connected to one of said electrodes and is formed with an opening therein to admit the other electrode;
   an insulating spacer (30) retaining said other electrode in the housing;
   said insulating spacer being formed with a narrow slot (60) to permit removal of metal vapors and condensed metal from the interior of said housing.

9. Apparatus according to claim 8, wherein said insulating spacer is dome-shaped extending within the housing to deflect cooling liquid applied thereagainst, and is formed with a narrow slot of about 0.1 mm. width.

10. Apparatus according to claim 1, wherein said transparent wall section includes a window extension of the tube (FIG. 4, 68) insulatingly and removably secured to said housing (38);

and a transparent quartz window (50') closing off said extension tube (68).

11. Apparatus according to claim 10, including a pair of liquid removal channels (70) formed in the extension tube (68) close to said quartz window to permit removal of condensed, injected liquid.

12. Apparatus according to claim 1, including a cooling jacket entirely surrounding said housing as well as said electrodes extending into said housing, to cool the housing and the electrodes, the cooling capacity of said jacket being determined relative to the size of the housing and the temperature therein such that the metal vapors will condense at the housing walls and relieve stresses on the housing.

13. Apparatus according to claim 2, wherein the cathode electrode is a hollow elongated body formed with said capillary bore to conduct liquid mercury to the terminal end of said electrode, the end of said capillary bore being recessed (14) from the end portion of the electrode;

a cooling mantle (56) extending along the electrode and short of the tip end thereof to conduct cooling liquid along said electrode and at least a part of said tip portion;

a cooling jacket surrounding said housing, said electrodes and said mantle; narrow slots having a width in the order of 0.1 mm. interconnecting said housing and said jacket to permit removal of condensed liquid mercury from within the housing;

and means to separately cool said housing and said electrodes and to remove cooling liquid from the space between said electrode and said mantle and to remove and separate-out condensed mercury from the cooling fluid in said cooling jacket.

14. Apparatus according to claim 13, including an insulating spacer securing the tip portion of said electrode in said housing, and separating said electrode from said housing electrically; said insulating spacer being dome-shaped and extending into said housing, and located just beyond termination of said mantle to deflect cooling liquid forced between said electrode, part of said tip portion, and said mantle and directed towards said insulating spacer.

References Cited

UNITED STATES PATENTS

| | | | |
|---|---|---|---|
| 1,076,058 | 10/1913 | Podszus | 313—34 |
| 2,275,739 | 3/1942 | Dellian et al. | 313—34 X |
| 3,418,507 | 12/1968 | Young | 313—220 X |

RAYMOND F. HOSSFELD, Primary Examiner

U.S. Cl. X.R.

313—34, 110, 220